UNITED STATES PATENT OFFICE.

WALTHER MATHESIUS, OF BERLIN, GERMANY.

BINDING MATERIAL AND THE METHOD OF PREPARING.

1,233,384. Specification of Letters Patent. Patented July 17, 1917.

No Drawing. Application filed May 21, 1915. Serial No. 29,601.

*To all whom it may concern:*

Be it known that I, WALTHER MATHESIUS, subject of the King of Prussia, residing at Berlin-Nikolassee, Germany, Sudetenstrasse 54, have invented certain new and useful Improvements in a Binding Material and the Method of Preparing, of which the following is a specification.

My invention relates to a method of briqueting ores and more especially to improvements in the preparation of the binding material. The invention is based upon the knowledge, not new in itself, that iron oxid and hydroxid are not passive against the action of free lime or alumino silicates containing a high percentage of lime, but will actively enter into the molecule of the binding material with formation of ferro alumino silicates of lime. The use of such a binding material for the briqueting of iron ores offers the great advantage of considerably diminishing the percentage of foreign material added to the ores in the briqueting operation, this diminution being in proportion to the quantity of iron oxid or hydroxid entering into the molecule of the binding material. In consequence thereof the binding material itself will show a high percentage of iron and the quantity of foreign substances required for the agglomeration will be exceedingly small, especially so, if compared with the quantities of cement or the like required for the agglomeration of friable ores by other methods.

The material to be used for the agglomeration of the ores is prepared by intimately mixing highly basic alumino silicates or caustic lime with finely divided iron oxid or materials containing iron oxid and then heating the mixture to a temperature below the temperature of sintering, where the material is still easy to pulverize and to grind. I have ascertained that although heating at least to sintering temperature heretofore considered necessary for the preparation of cements containing iron is not employed in my new process, nevertheless the iron oxid reacts with the alkaline component of the mixture (chalk) and there results a substance which on being mixed with additional iron furnishes solid briquets.

I wish it to be understood that the new materials obtained by the process described above do not *per se* represent a cement and that on being for instance mixed with inert substances such as sand or the like they cannot be used as binding materials but after being mixed with further iron ore they will agglomerate most perfectly and furnish excellent stable briquets.

The following description gives an example of the preparation and use of the new material for the agglomeration of fine grained or friable iron ore.

The iron ore is separated by a suitable decanting operation into a finer part and a coarser part. The finer part is mixed with burnt dry-slaked lime as carefully and intimately as possible in the form of a more or less stiff slime, for instance in an edge mill. This mixture is then brought to a higher temperature, care being taken to avoid all sintering. The material, which is easily pulverizable, may, if necessary, be again ground, is then mixed with the rest of the iron ore, is moistened and molded into suitable shape under pressure.

Another mode of proceeding is the following: Burnt lime is ground and dry-slaked with the finely divided part of the ore. This material is then heated to a temperature below the sintering temperature, as described above. It is essential in every case that first of all the alkaline component (lime or highly basic alumino silicate) is intimately mixed with the finely divided slimy iron oxid, and this mixture is then brought to a higher temperature.

If a friable iron ore intermixed with gangue containing lime is to be briqueted, the addition of burnt lime may be omitted, and in such a case it is only necessary to heat the friable components of the ore to a sufficiently high temperature which however should be below the sintering temperature, in order to transform them without any further treatment into a material of high binding power which may, after having been finely ground be used for agglomerating other friable parts of the same or other iron ores. If the ore, as is the case frequently, is so rich in lime as to show, after calcination, fine grinding and forming, the phenomenon of swelling, it is merely necessary to add to the binding material after calcination, but before grinding, a corresponding percentage of uncalcinated friable ore rich in iron oxid. In this addition the lime is then saturated in the form of carbonate of lime; the iron oxid on the other hand is free and capable of being bound. In consequence thereof it is capable at once to be bound by the excess of caustic lime contained in the calcinated ore and to prevent swelling phenomena from arising.

Although I have described the new method as applied to the briqueting of iron ore exclusively, I wish it to be understood that it may be applied with advantage also to the agglomeration of other substances containing iron such as furnace dust or the like, and the term "iron ore" as used in the claims shall include such other substances as well.

I claim:

1. The method of preparing a binding material for iron ore briqueting which consists in intimately mixing highly basic lime compounds with finely divided oxids of iron and heating the mixture to a temperature not above the sintering temperature.

2. The method of preparing a binding material for iron ore briqueting which consists in heating a mixture of a highly basic lime compound and finely divided oxids of iron to a temperature near but below the temperature where sintering occurs.

3. The method of preparing a binding material for iron ore briqueting which consists in heating an intimate mixture of burnt dry-slaked lime and finely divided iron oxid to a temperature lying close to but below the temperature where sintering occurs.

4. The method of preparing a binding material for iron ore briqueting which consists in dry-slaking burnt lime with a slime of finely divided iron oxid, intimately mixing the product, and heating it to a temperature lying close to but below the temperature where sintering occurs.

5. Method of briqueting iron ore which consists in intimately mixing highly basic lime compounds with finely divided oxids of iron, heating the mixture to a temperature not far below the temperature where sintering occurs, mixing the heated finely divided product with iron ore, and forming the mixture into briquets.

6. The method of briqueting iron ore which consists in dividing the ore into finer and coarser particles by decantation, intimately mixing the finer parts with highly basic lime compounds, heating the mixture to a temperature not far below the temperature where sintering occurs, mixing the product resulting from the heating operation with the coarser parts of the ore and molding or shaping this mixture.

7. The method of briqueting iron ore which consists in dividing the ore into finer and coarser particles by decantation, intimately mixing the finer parts with caustic lime, heating the mixture to a temperature not far below the temperature where sintering occurs, mixing the product resulting from the heating operation with the coarser parts of the ore and molding and shaping this mixture.

8. The method of briqueting iron ore which consists in heating a mixture of ore and lime compound to a temperature near but below that where sintering occurs, grinding the material, and molding or shaping the ground product by the action of heat.

9. The method of briqueting iron ore which consists in heating a mixture of ore and lime compound to a temperature near but below that where sintering occurs, adding additional ore, finely grinding the mixture, and molding or shaping the ground material.

In testimony whereof I affix my signature in presence of two witnesses.

WALTHER MATHESIUS.

Witnesses:
 WOLDEMAR HAUPT,
 HENRY HASPER.

Copies of this patent may be obtained for five cents each, by addressing the "Commissioner of Patents, Washington, D. C."